United States Patent [19]

Koss

[11] Patent Number: 5,231,577
[45] Date of Patent: Jul. 27, 1993

[54] METHOD AND SYSTEM FOR PROCESSING FORMATTING INFORMATION IN A SPREADSHEET

[75] Inventor: Michael C. Koss, Bothell, Wash.

[73] Assignee: Microsoft Corporation, Redmond, Wash.

[21] Appl. No.: 505,850

[22] Filed: Apr. 6, 1990

[51] Int. Cl.$^5$ .................. G06F 15/38; G06F 15/00; B41B 15/00
[52] U.S. Cl. .................. 364/419; 395/140; 395/148; 395/149
[58] Field of Search .............. 364/419, 926.1, 408; 395/575, 500, 600, 700, 140, 148, 149

[56] References Cited

U.S. PATENT DOCUMENTS

| | | | |
|---|---|---|---|
| 4,992,954 | 2/1991 | Takeda et al. | 341/67 |
| 5,021,995 | 4/1991 | Quint et al. | 364/900 |
| 5,033,009 | 7/1991 | Dubnoff | 364/523 |
| 5,075,847 | 12/1991 | Fromme | 395/700 |

Primary Examiner—Roy N. Envall, Jr.
Assistant Examiner—Khai Tran
Attorney, Agent, or Firm—Seed and Berry

[57] ABSTRACT

A method and system wherein characters in cells of a spreadsheet may be assigned character attribute information, such as font type, font size, bold, italics, underline, etc., wherein the character attribute information is referred to as an extended format. Each possible extended format combination is stored in an extended format table comprising a linked list of extended format combinations. When a new extended format combination is created, its position in the XF table is calculated according to a predetermined hash function. If two extended format combinations hash to the same location, the conflicting extended format is placed in an overflow table. Each cell in the spreadsheet contains an internal index which references a cell to an entry in the extended format table. Character format information is not stored in individual cells, and cells may share the same format combinations by merely setting the cell index to point to a desired format combination.

20 Claims, 12 Drawing Sheets

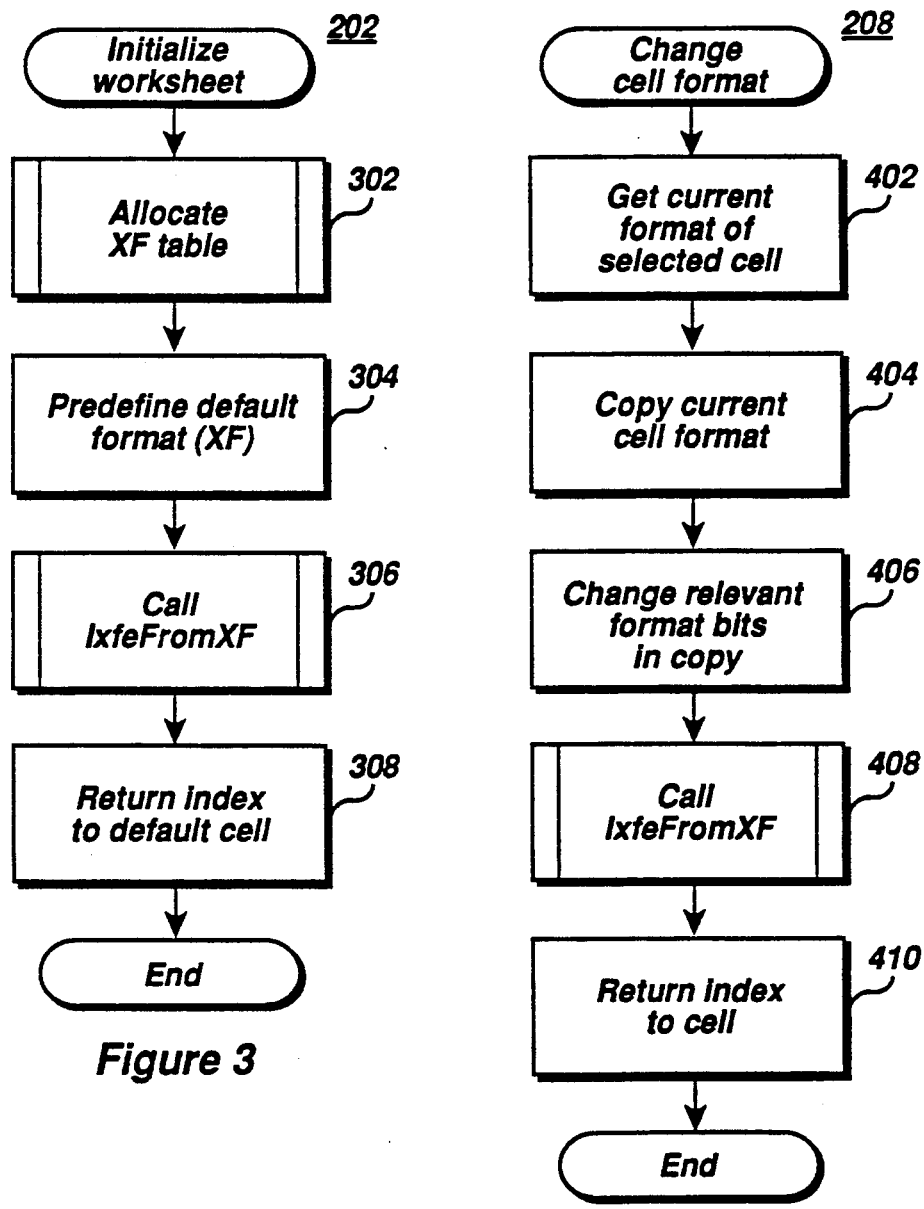

METHOD AND SYSTEM FOR PROCESSING FORMATTING INFORMATION IN A SPREADSHEET

TECHNICAL FIELD

This invention relates to the field of computer systems, and more specifically, to a method and means for enhancing the performance of a spreadsheet application.

BACKGROUND OF THE INVENTION

Spreadsheets are a well-known means for processing vast amounts of numeric information wherein particular cells in the spreadsheet may be related with known mathematical relationships. An example of a spreadsheet application is the Excel spreadsheet, available from Microsoft. Recently, computer application programs have incorporated the ability to display an expanded array of cell border, background and character attribute information wherein data is displayed to the user with the same format attributes in which printed data will appear. For example, characters may typically be printed with any of a number of fonts wherein characters may be bold, underlined, italicized, centered, etc. Similarly, individual cells may be displayed with various borders and background colors. In prior spreadsheet applications, format attribute information was stored in memory. Therefore, for each spreadsheet cell, several bytes of information were required. For example, for each character, individual data bytes were required for the character values, as well as attribute information, such as fonts; and position enhancements as mentioned above, e.g., superscript; and appearance, such as bold and italics. In prior systems, where relatively small amounts of data were processed, this arrangement provided acceptable performance and utility. However, as computer systems have become more sophisticated, the size and complexity of programs has increased dramatically. The increased amount of data processed in applications such as spreadsheets, coupled with the desirability of providing enhanced character attributes, has rapidly increased the memory needed to support an application. Therefore, techniques which improved speed, efficiency and performance of computer application programs have become increasingly important.

SUMMARY OF THE INVENTION

Accordingly, it is an object of the present invention to provide a method and means for increasing the efficiency of a computer application program which provides the capability to display and print cell border, background and character attribute information.

It is another object of the present invention to provide an improved method and means of reducing cell size in a computer spreadsheet application.

It is still another object of the present invention to provide an improved spreadsheet application wherein character attributes may be assigned to any number of cells without significantly increasing the memory requirements of the application.

Briefly described, the present invention contemplates a method and system wherein characters in cells of a spreadsheet may be assigned character attribute information, such as font type, font size, bold, italics, underline, etc., wherein the character attribute information is referred to as an extended format. According to the principles of the present invention, each possible extended format combination is stored in an extended format table comprising a linked list of extended format combinations. Each cell in the spreadsheet contains an internal index pointer which references a cell to an entry in the extended format table. Therefore, character format information is not stored in individual cells, and cells may share the same format combinations by merely setting the cell index pointer to point to a desired format combination. The present invention dramatically reduces the memory requirements for the application by completely eliminating redundant character attribute combinations and dramatically increases the efficiency of the application by eliminating the need for reading character attribute information from each individual cell.

BRIEF DESCRIPTION OF THE DRAWINGS

These and other objects may be completely understood through the detailed description of the invention below and the accompanying figures of drawings in which:

FIG. 3 is a flow diagram of the routine invoked to initialize a spreadsheet.

FIG. 4 is a flow diagram of the routine invoked to change cell formats in the spreadsheet application of FIG. 1.

DETAILED DESCRIPTION OF THE INVENTION

The present invention provides an improved structure for application programs wherein cell formatting information may be associated with cell borders, backgrounds and characters, or groups of characters, without significantly increasing the memory requirements of the application. In accordance with the present invention, characters or groups of characters may be displayed and printed with any of a number of attributes, such as font type, font size, color, italics, underlining, bolding, etc. For example, characters or groups of characters may be displayed with character formats, such as Times Roman, ten point, bold and italics, or Helvetica, fourteen point, bold and underlined, etc. Similarly, individual cells may be displayed with various borders and background colors. In prior systems, cell format information was attached to individual cells. Therefore, individual cells included numerous format descriptors, which in many cases, doubled the data required to describe each cell. In contrast, the present invention provides a compact structure wherein unique cell formatting combinations are stored in an extended format (XF) table which is composed of an array of table entries. Instead of providing cells with imbedded format information, the cells are provided with pointers which comprise indices into the extended format (XF) table. Therefore, the cell attribute information for each cell is defined once, wherein cells which have common character formats merely share common pointers into the extended format table, thus eliminating redundant cell format descriptions. For the purposes of this description, a cell may be defined as a region having a background, a data field and a description of its mathematical relationship with respect to other cells.

Figure 1:
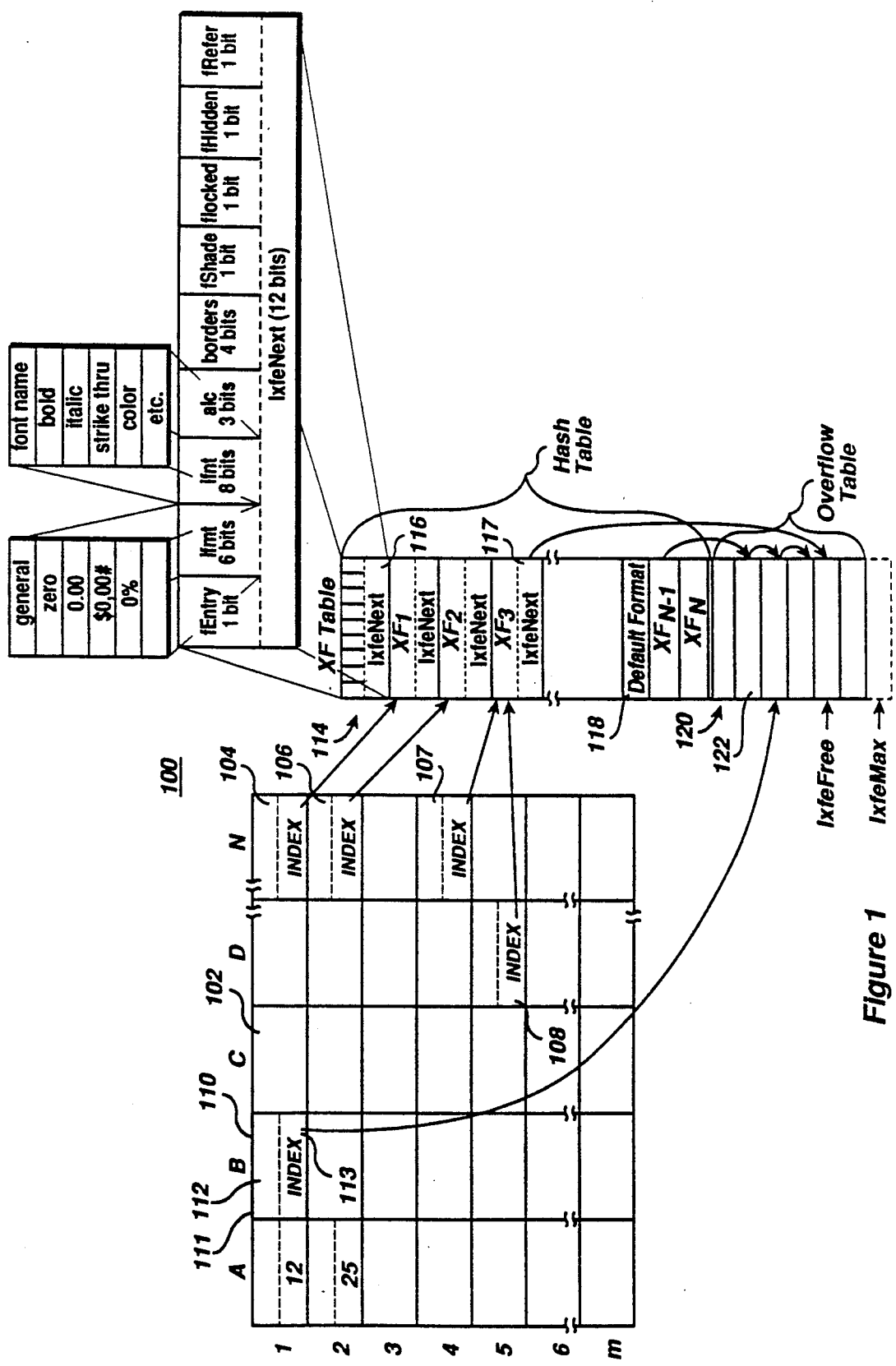
FIG. 1 is a diagram of the improved structure of the computer spreadsheet application of the present invention.

Referring now to FIG. 1, the structure of the improved spreadsheet application of the present invention is shown. Spreadsheets are a well-known type of computer application wherein the computer apparatus, under the control of the spreadsheet application, is programmed to modify vast amounts of data based on predefined mathematical relationships between respective cells. While the preferred embodiment of the present invention is disclosed in the context of a computer spreadsheet application, those skilled in the art will appreciate that the principles of the present invention may be applied to virtually any type of computer program which incorporates formatting or attribute information.

In the system 100, a spreadsheet 102 may include exemplary cells 104, 106–108, which may be organized in a conventional manner wherein the cells of spreadsheet 102 are organized in a plurality of rows (1-M) and a plurality of columns (1-N). Each spreadsheet cell in the system 100 comprises a character field, e.g., character field 110; a border region, e.g., border region 111; a background region, e.g., background region 112; and an internal XF table index 113 which points to a location in XF table 114. According to the principles of the present invention, the table indices of cells point to unique format combinations, e.g., cells 104, 106 having indices which point to unique entries in the XF table 114, or may share format combinations, e.g., cells 107, 108 having indices which point to the same entry in the XF table 114.

The XF table 114 is a hash table which comprises an array of unique character format combinations. In the preferred practice of the present invention, each entry in the XF table contains 10 fields which are as follows:

| | |
|---|---|
| fEntry | (1 bit) This bit indicates whether a particular format entry contains a valid format. |
| ifxeNext | (12 bits) This is a pointer to the next XF in the linked list of XF's. |
| ifmt: | (6 bits) This contains an index into the "Number Format" for the cell (e.g., the number of decimal points, etc.). |
| ifnt | (8 bits) This indicates font attributes such as bold, italic, color, etc. |
| alc: | (3 bits) Cell alignment. |
| borders: | (4 bits - fLeft, fRight, fTop and fBottom.) Individual cell borders. |
| fShade: | (1 bit) Individual cell shading. |
| fLocked: | (1 bit) Cell can't be changed when sheet is locked. |
| fHidden: | (1 bit) Cell formula is not displayed when sheet is locked. |
| fRefer | (1 bit) This bit indicates whether this particular cell format is referenced by a cell. |

In the preferred practice of the present invention, the XF table contains 61 table entries wherein indices into the XF table 114 are generated according to a predetermined hash function. When the XF table 114 is first allocated, a default extended format 118 is installed in the XF table 114 in accordance with the generated hash index for the default format 118 wherein the index for each cell in the worksheet 100 is initialized with the value of the index for the default format. In addition to the main XF table, an overflow table 120 is provided wherein additional extended formats may be stored. The overflow table is also used for storing extended formats which hash to values which already point to locations in the extended format table. The overflow table 120 is preferably of variable size, wherein the size of the table is incrementally expanded in groups of thirty two-table entries to reduce the need for continuously recalculating the size of the overflow area 120.

Figure 2:
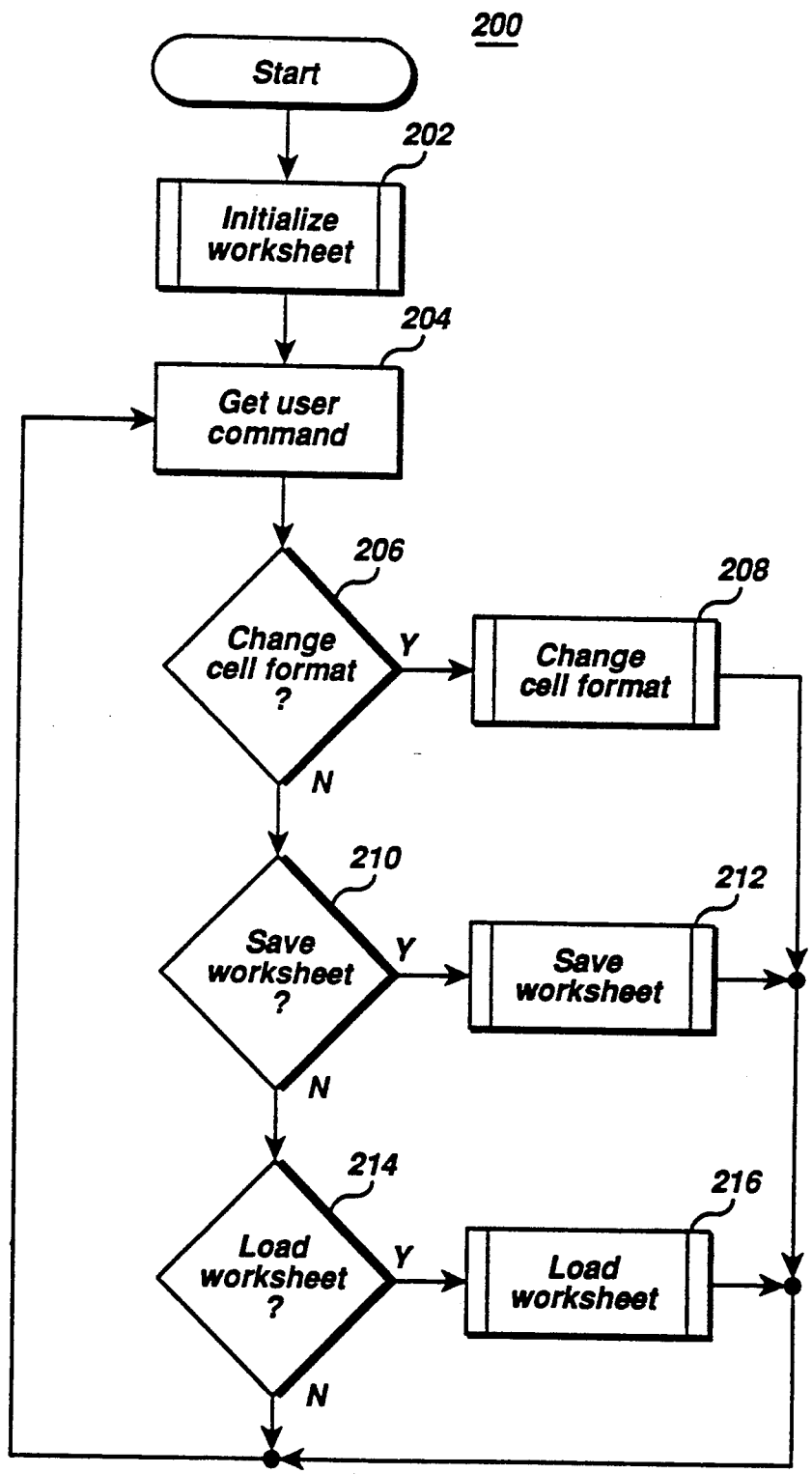
FIG. 2 is a flow diagram of the overall functional operation of the present invention.

Referring now to FIG. 2, whenever the system 100 is first activated, process 202 is invoked to initialize a spreadsheet or worksheet. Once initialized, control passes to item 204 to wait for a user command. When a user input is received, the command is tested by decisions 206, 210 and 214, wherein control passes to process 208 if a "change cell format" command is detected; control passes to process 212 if a "save worksheet" command is detected; and control passes to process 216 if a load worksheet command is detected. Once a desired task is completed, control returns to item 204 to wait for the next user command.

Referring now to FIG. 3, process 202 is invoked to initialize a worksheet. When invoked, the process 302 is called to allocate the XF table 114. Control then passes to item 304 to recall a default XF format. In the preferred practice of the present invention, the default XF format comprises a font type of Helvetica, 10 point, plain style, and a cell type of no borders, black color, etc. Item 306 then installs the default XF format in the XF table in accordance with the index generated by the IxfeFromXF routine according to the predetermined hash function. Control then passes to item 308 to return the index to the cell.

Referring now to FIG. 4, the process 208 is invoked to change a cell format. When invoked, item 402 fetches the current cell format by recalling the format in the XF table pointed to by the index of the cell. Item 404 then copies the current cell format into a temporary location. Control then passes to item 406 to change the relevant bits in the extended format of interest Process 408 is then invoked to install the modified extended format in the XF table and to generate an index for the newly created cell by hashing the new extended format in accordance with the hashing function. Item 410 then returns the index to the cell of interest.

Figure 5:
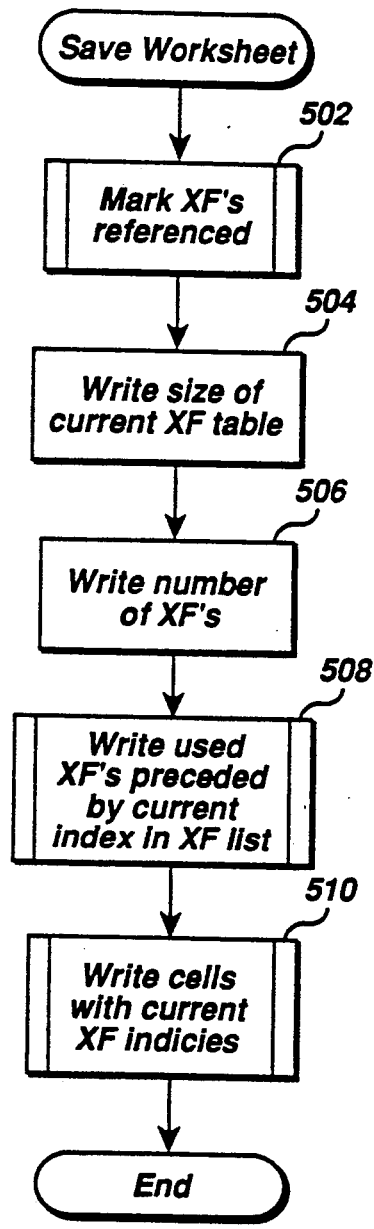
FIG. 5 is a flow diagram of the routine invoked to save a spreadsheet having extended formats.

Referring now to FIG. 5, the routine 212 is invoked to save an existing worksheet which may have been modified. When invoked, process 502 first marks cells referenced to indicate which extended formats are currently used by worksheet cells. Item 504 then saves the size of the current XF table, and item 506 saves the number of currently used extended formats. Next, process 508 is invoked to save used extended formats preceded by the current extended format index in the array of extended formats. Once the extended formats are written in the extended format table, process 510 is invoked to write the data stored in individual cells, along with their current extended format indices.

Figure 6:
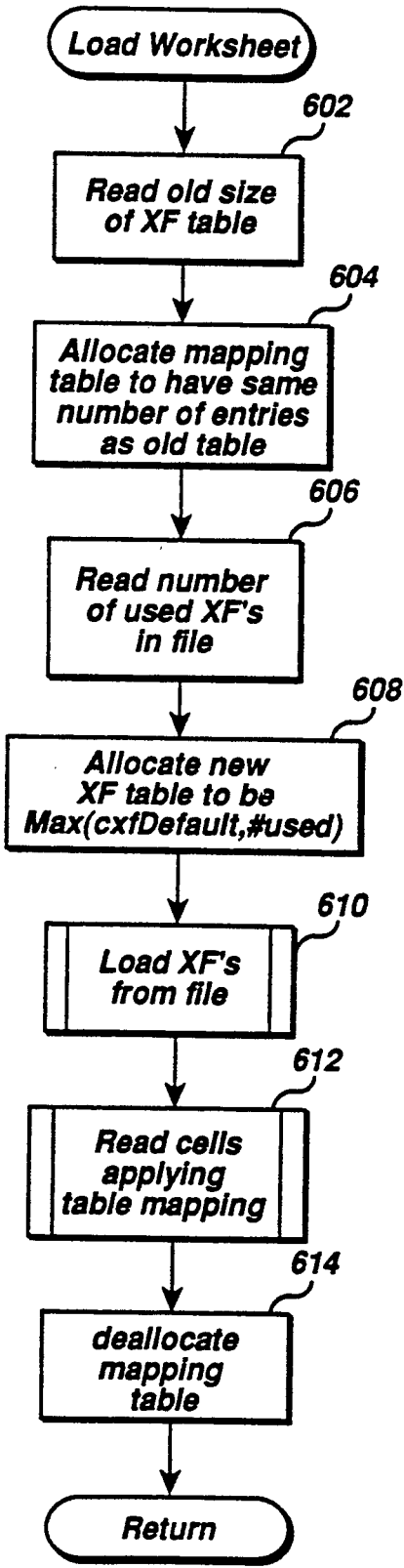
FIG. 6 is a flow diagram of the routine invoked to load a spreadsheet having extended formats.

Referring now to FIG. 6, the process 216 is invoked to load an existing worksheet. When invoked, item 602 reads the size of the old XF table, and item 604 allocates a mapping table having the same number of entries as the old XF table. Item 606 then reads the number of used extended formats in the file. Once the number of used extended formats is determined, item 608 allocates a new XF table with either the size of the maximum number of used extended formats or the size of the default XF table. Process 610 is then invoked to load the extended formats from the file of interest. Once the XF table is loaded, process 612 is invoked to read the cell data and to load the cells in row major order while applying table mapping. Item 614 then deallocates the mapping table.

Figure 7A:
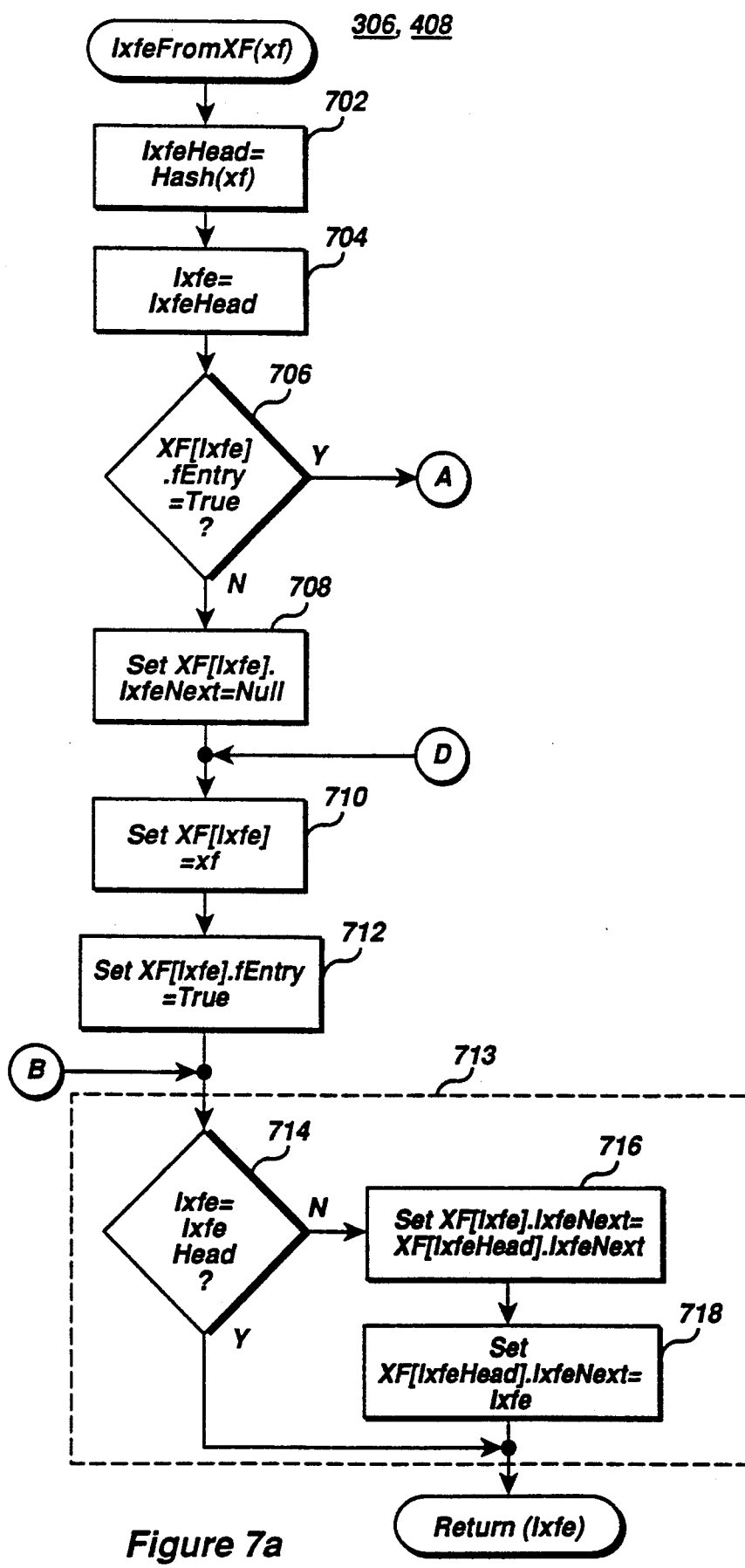
FIGS. 7A-7C are a series of flow diagrams of the IxfeFromXf routine which is invoked by the routine of FIG. 4 to install an extended format in the extended format table and return an index for the installed extended format.
Figure 7B:
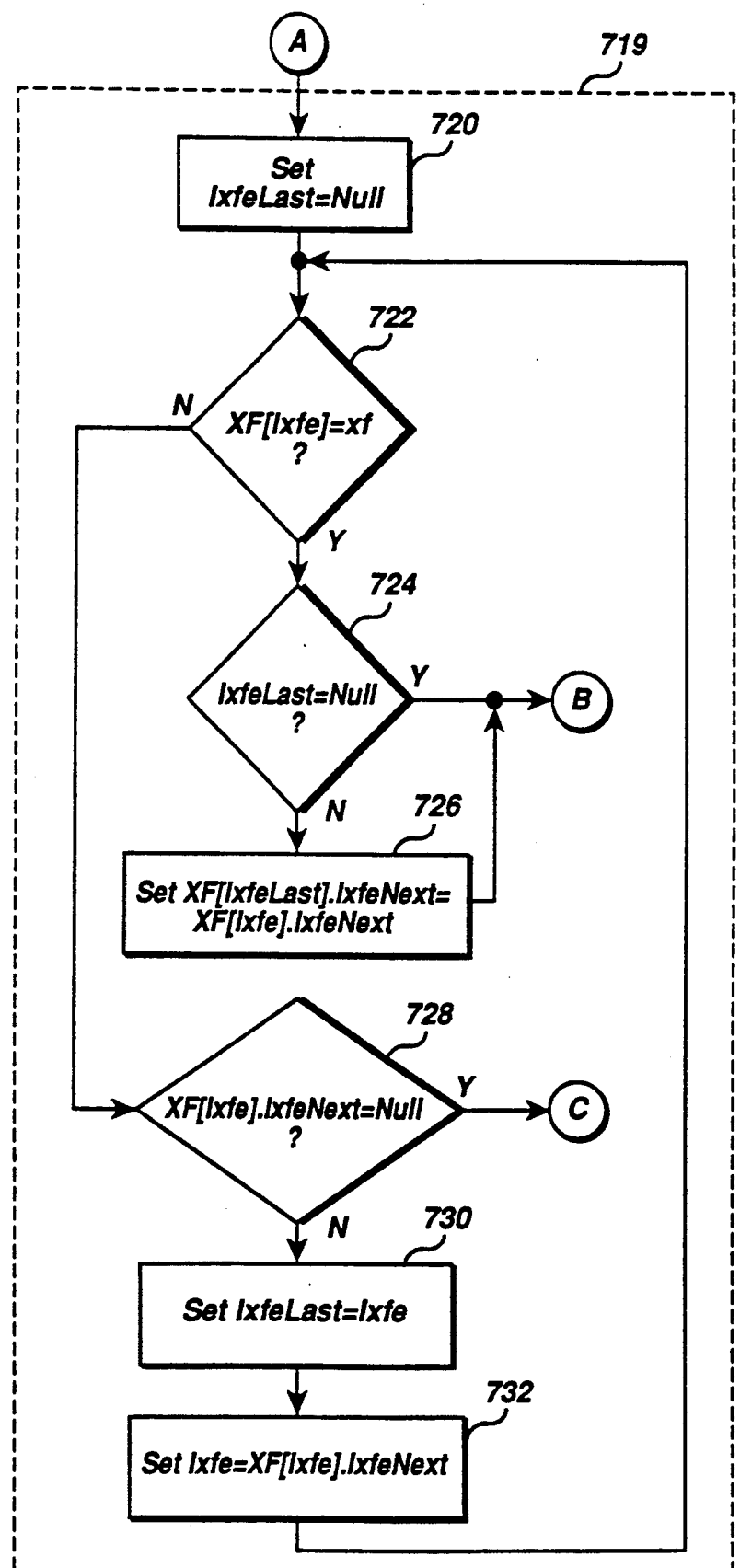
Figure 7C:
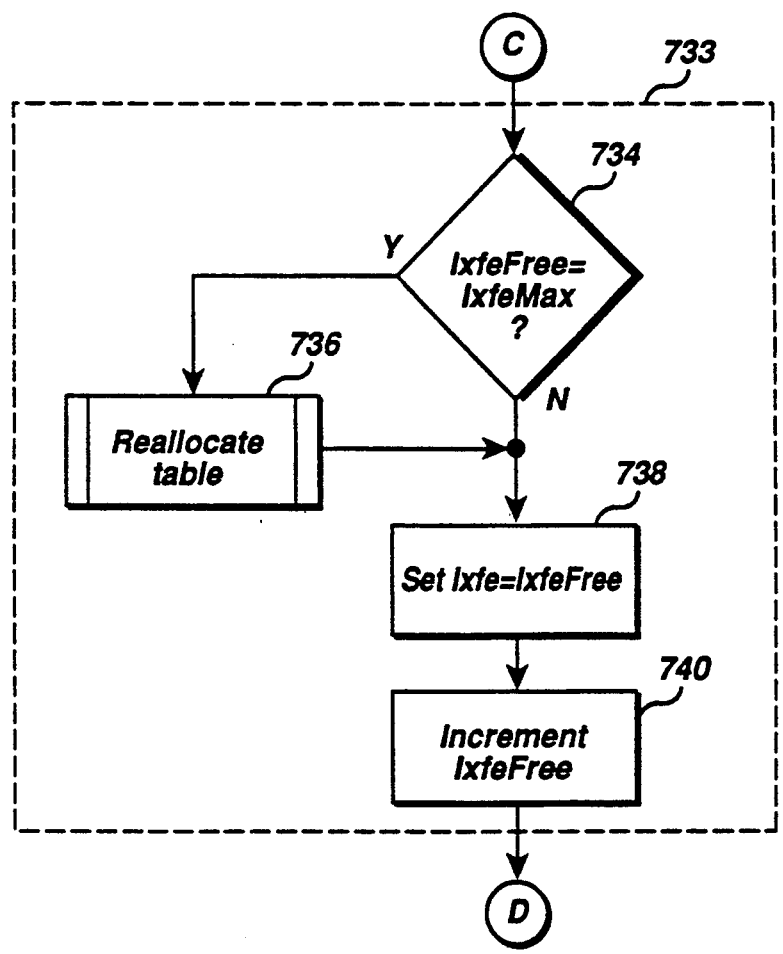

Referring now to FIGS. 7a-7c, the IxfeFromXf(xf) routine 306, 408 is invoked whenever a new extended format is created. The routine 306, 408 calculates an index for the new extended format, installs the new extended format in the XF table and returns the newly calculated index to the cell of interest. The overall function of the routine 306, 408 may be explained as follows. As noted above, the default XF table is allocated with 61 main table positions and 32 overflow positions. When a new extended format combination is created, its position in the XF table is calculated according to a predetermined hash function. If two extended format combinations hash to the same location, the conflicting extended format is placed in the overflow table. If the overflow table is full, the routine 306, 408 expands the overflow table to accommodate new extended formats. When invoked, item 702 determines the index of the first entry in the XF table according to the hash function. Those skilled in the art will appreciate that any of a number of well-known hashing algorithms would function satisfactorily in the system of the present invention. Item 704 then sets the index for the newly created XF table entry equal to the index for the first entry in the XF table. Decision 706 then determines whether the "fEntry" flag in the extended format pointed to by the retrieved index is set to determine whether the referenced extended format is currently used. If not, the extended format is installed in that location in the XF table. If the "fEntry" bit is set, control passes to loop 719 which traverses the XF table to find a matching extended format in the XF table. If one is not found, the extended format is installed in the overflow table.

If the result of decision 706 is negative, i.e., the extended format is not used, item 708 sets the value of the collision pointer XF[ixfe].ixfeNext equal to Null to initialize the hash collision pointer for that XF table entry. Item 710 then sets the value of XF[ixfe] equal to the value of XF to copy the new extended format into the XF table. Control then passes to item 712 to set the value of XF[ixfe].fEntry equal to true to indicate that the extended format of interest is referenced and used.

Process 713 is then invoked to install the extended format as the first or second entry of the XF table. This function is performed to ensure that frequently used extended formats tend to appear at the beginning of their hash collision list. In practice, each extended format is part of a hash collision list. The entries stored in the main body of the XF table comprise the head elements of the hash collision lists and entries in the overflow area of the XF table comprise the successive elements in the hash collision list. Therefore, as shown in FIG. 1, if for example, a new XF hashed to the same position as XF 117, its ixfeNext index would be adjusted to point to the next available entry in the overflow table. When invoked, decision 714 determines whether the new extended format is being inserted in the initial hash position by testing whether the index ixfe equals ixfeHead. If not, item 716 sets the value of XF[ixfe].ixfeNext equal to XF[ixfeHead].ixfeNext to copy the hash collision pointer from the head element to the collision pointer of the new element. Item 718 then sets the value of XF[ixfeHead].ifeNext equal to ixfe, thus installing the next XF entry as the second XF entry in the hash collision list. If the result of decision 714 is affirmative or at the completion of item 718, the routine returns the value of ixfe, the index of the installed XF.

Referring now to FIG. 7b, the routine 719 is entered whenever a newly created table entry's hash index matches an existing table entry's index. Therefore, the routine 719 may be thought of as a collision resolution routine. The variable ixfeLast will be used to point to the previous XF entry as the hash collision list is traversed. When invoked, item 720 sets the pointer ixfeLast equal to a null value to indicate no elements have been scanned. Decision 722 then determines whether the extended format pointed to by ixfe is equal to the desired extended format. If so, decision 724 determines whether the IfxeLast pointer equals null, thus indicating the first entry in the XF table is equal to the extended format of interest. If so, control passes to decision 714, previously discussed. Otherwise, control passes to item 726 which sets the value XF[ixfeLast].ixfeNext equal to XF[ixfe].ixfeNext. This step is performed to remove the matched XF entry from its current location in its hash collision list, wherein its new position in the hash collision list is set by process 713.

If the result of decision 722 is negative, a match has not yet been found, and control passes to decision 728 which determines whether the value of XF[ixfe].ixfeNext=Null, thus indicating the end of the hash collision list has been reached. If the result of decision 728 is positive, control passes to decision 734 to allocate a new entry from the overflow table. Otherwise, control passes to items 730 and 732 which fetch the next table entry pointer and save the value of the table pointer of the XF table entry currently referenced by first setting the value of IxfeLast equal to Ixfe and then setting the value of Ixfe equal to the value of XF[Ixfe].IxfeNext. Control then returns to decision 722.

Referring now to FIG. 7c, the process 733 is entered to allocate an entry from the overflow table. The variable, ixfeFree is used as a pointer to the next available location in the overflow portion of the XF table. The variable IxfeMax is used as a pointer to one location past the last location in the overflow portion of the XF table. When invoked, decision 734 determines whether the variable IxfeFree equals IxfeMax, thus indicating there are no further entries available in the XF table. If the result of decision 734 is affirmative, control passes to process 736 to reallocate the XF table. Otherwise, control passes to item 78 to install the XF in the location of the overflow table pointed to by IxfeFree. Item 740 then increments the variable IxfeFree and the control returns to item 710.

Figure 8:
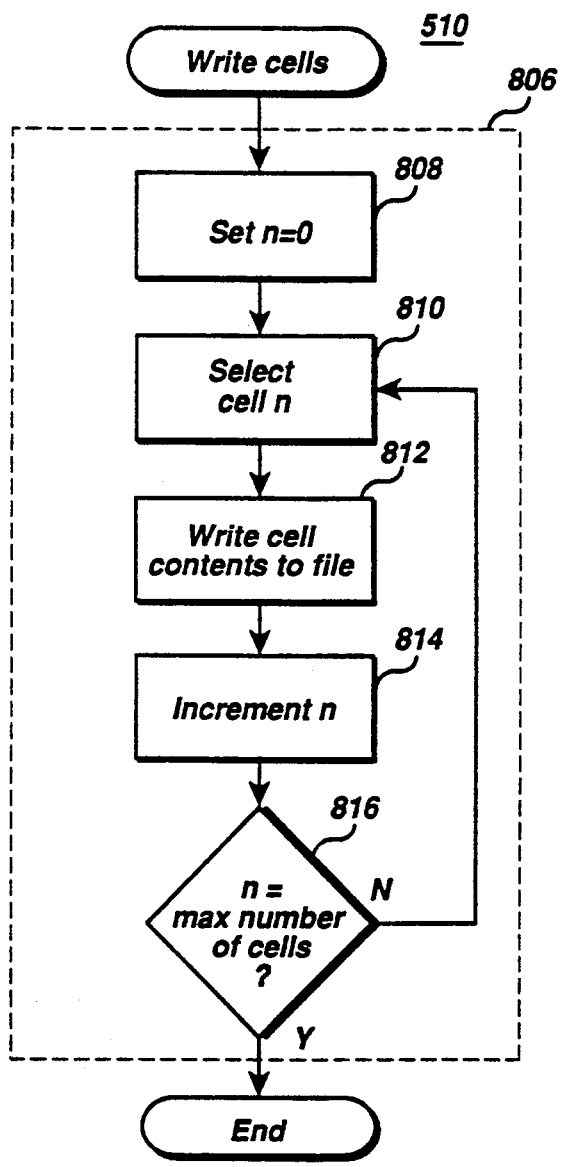
FIG. 8 is a flow diagram of the routine invoked by the routine of FIG. 5 to write cells from the worksheet during a save operation.

Referring now to FIG. 8, the routine 510 is invoked to write cells to a file when saving a worksheet. Loop 806 is entered to write the worksheet cells (including the index into the XF table) to the file. When loop 806 is entered, item 808 initializes a worksheet cell index to point to the first cell in the worksheet. Item 810 then selects the cell pointed to by the index. Control then passes to item 812 which writes the cell contents to the file. The cell index is then incremented by item 814 to point to the next cell in the worksheet. Decision 816 then determines whether the cell index is pointing past the last cell in the worksheet. If not, control returns to item 810 to select the next cell in the worksheet. Otherwise, control returns to the calling routine.

Figure 9:
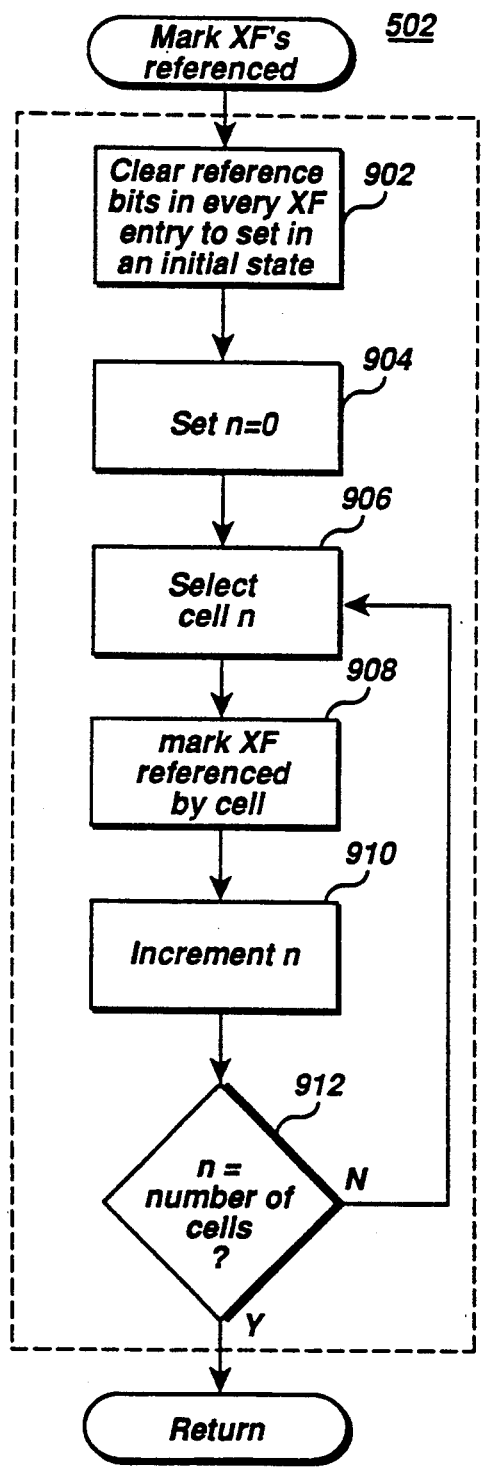
FIG. 9 is a flow diagram of the routine invoked by the routine of FIG. 5 to mark cells referenced.

Referring now to FIG. 9, the routine 502 is invoked by the routine of FIG. 5 to scan the current worksheet to determine which entries in the XF table are referenced by cells in the worksheet so that only used XF's are written with a file when the file is saved. When invoked, item 902 sets the fRefer bit in each XF table entry to an initial state, which indicates the XF table entry is not referenced. Item 904 then initializes an index to point to the first cell in the worksheet. Next, item 906 selects the cell pointed to by the index. Item 908 sets the fRefer bit in the XF table entry of interest. Control then passes to item 910 to increment the index. Once the index is incremented, decision 912 determines whether the index has been incremented past the last cell in the worksheet. If so, control returns to the calling routine. Otherwise, control returns to item 906 to process the next cell.

Figure 10:
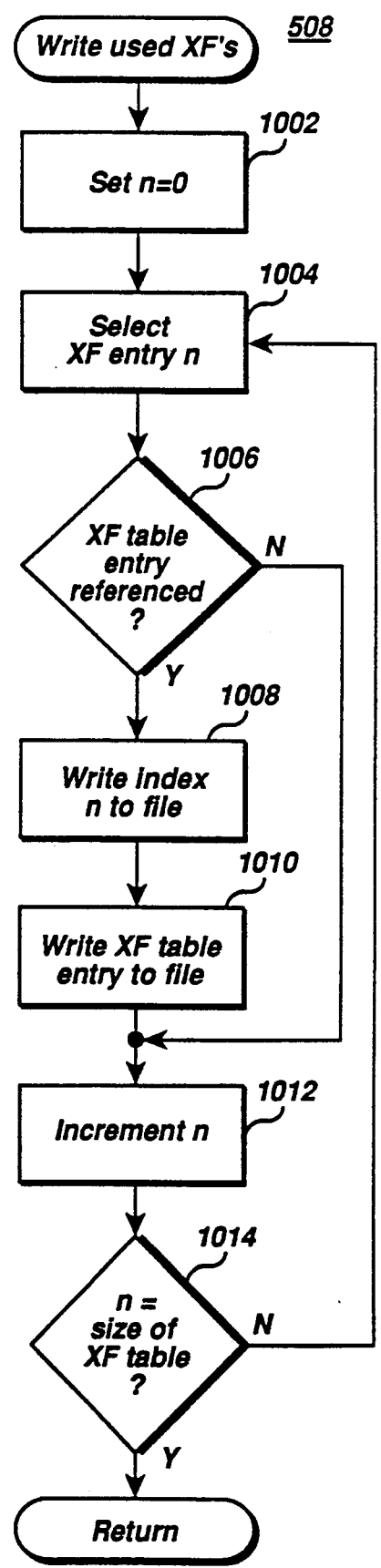
FIG. 10 is a flow diagram of the routine invoked by the routine of FIG. 5 to write used extended formats to the extended format table.

Referring now to FIG. 10, the routine 508 is invoked to write used XF's whenever a worksheet is saved. When invoked, item 1002 initializes an internal counter to zero wherein the counter comprises an index into the XF table. Item 1004 then selects the XF entry pointed to by the index. Once selected, decision 1006 determines whether the XF table entry pointed to by the index is referenced by testing the fRefer bit in the XF entry. If fRefer is not set, control passes to item 1012 to increment the index. Otherwise, control passes to item 1008 which writes the current index to the file. Item 1010 then writes the corresponding XF table entry to the file. Control then passes to item 1012 which increments the index. Next, decision 1014 determines whether the index has been incremented past the last entry in the XF table. If not, control returns to item 1004 to select the next entry in the XF table. Otherwise, control returns to the calling routine.

Figure 11A:
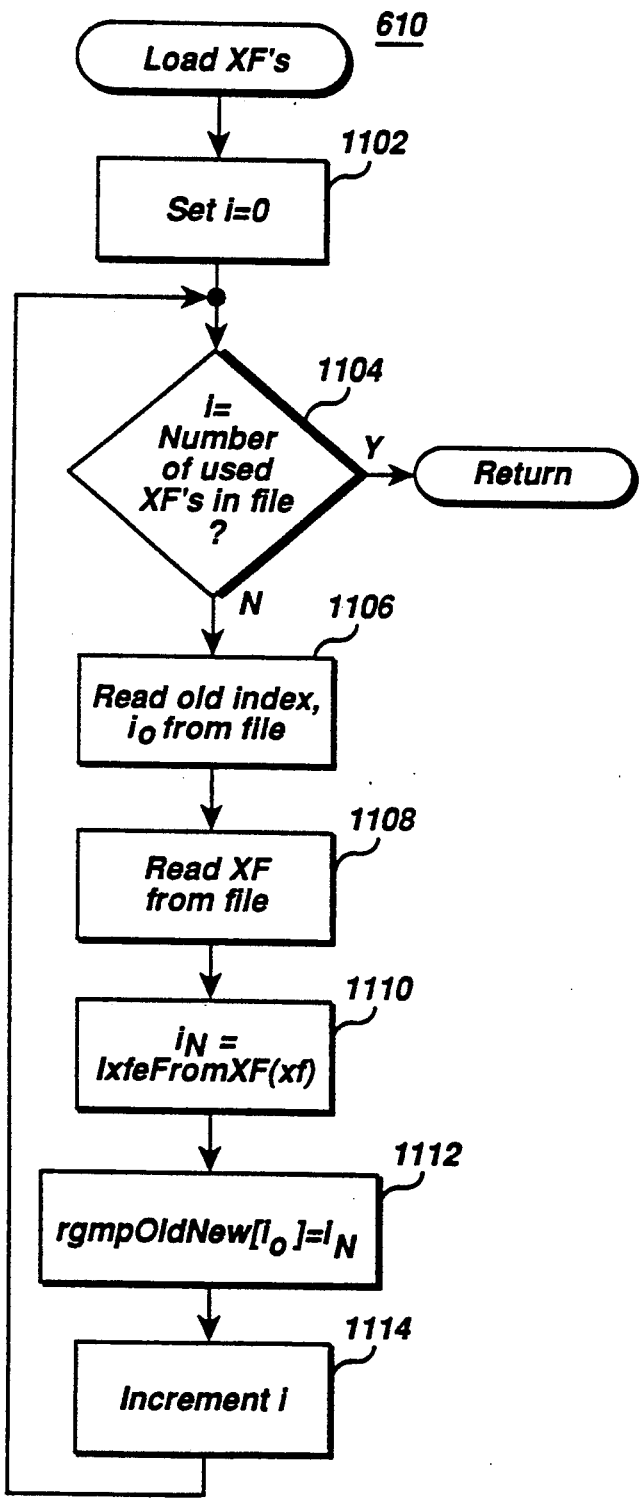
FIG. 11a is a flow diagram of the routine invoked by the routine of FIG. 6 to load extended formats from an existing file.
Figure 11B:
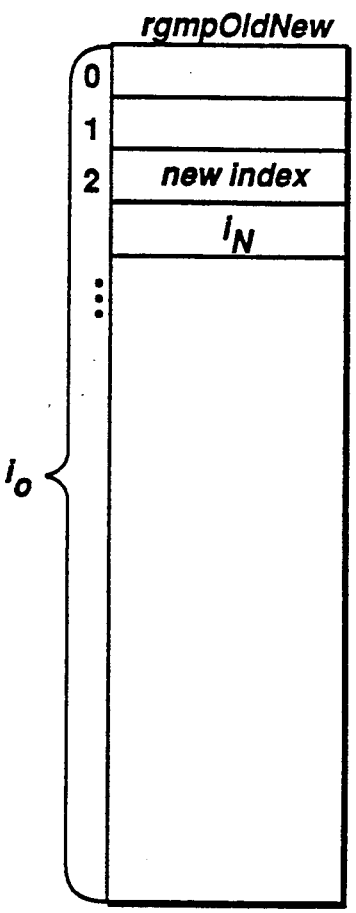
FIG. 11b is a diagram of rgmpOldNew table used for mapping an old XF table to a new XF table.

Referring now to FIGS. 11a and 11b, the routine 610 is invoked to load XF table entries from a file when opening a worksheet. During this process, previously used XF's may no longer be referenced. Therefore, one function of routine 610 is to recalculate the indices for currently referenced XF table entries and to update the index entries in worksheet cells to point to the proper entries in the XF table. When invoked, item 1102 initializes an index into the XF's stored in the file; decision 1104 then determines whether the value of the index is equal to the maximum number of table entries in the file. If so, routine 610 returns to the calling routine. Otherwise, item 1106 reads the old index from the file. Item 1108 then reads the XF from the file. A new index is generated in item 1110 by invoking the IxfeFromXf routine shown in FIG. 7. The new index is loaded into the table rgmpOldNew by item 1112 at the location specified by the old index to provide a mapping from the old index to the new index to be used when mapping the spreadsheet cells as shown in FIG. 10b. The index into the XF's stored in the file is then incremented by item 1114 and control returns to decision 1104.

Figure 12:
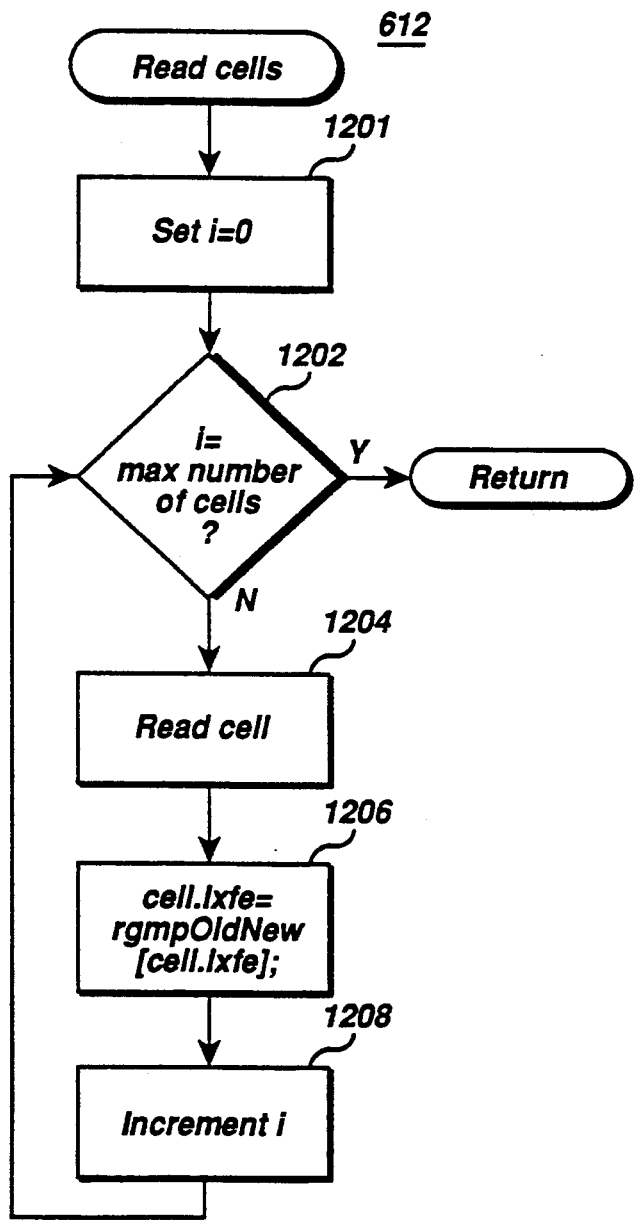
FIG. 12 is a flow diagram of the read cells routine invoked when opening a saved worksheet.

Referring now to FIG. 12, the routine 612 is invoked to read cells from a file when opening an existing worksheet. When invoked, item 1201 initializes an internal counter to zero. Decision 1202 then determines whether an index comprising an internal counter is pointing to the last cell in the worksheet. If so, the routine returns. Otherwise, control passes to item 1204 which reads the next cell in the file and stores the cell in the appropriate worksheet location. Recall that cells are written and recalled in row major order. Item 1206 then resets the current cell index to a value equal to the new cell index mapped by routine 610. In other words, indices stored with cells in a file refer to old XF table locations when the file was saved. When XF's are read from a file, they may be placed in new locations by process 610. Item 1206 remaps the old index to point to the new correct location via the rgmpOldNew mapping table. Item 1208 then increments the internal counter to point to the next cell in the worksheet and control returns to decision 1202.

Figure 13:
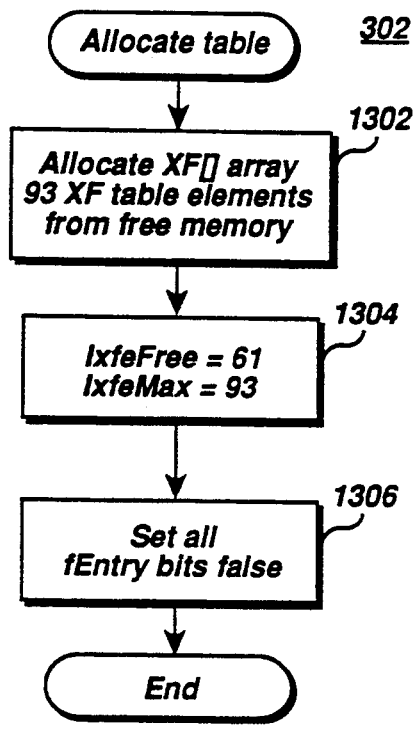
FIG. 13 is a flow diagram of the allocate table routine invoked by the routine of FIG. 3.

Referring now to FIG. 13, the routine 302 is invoked to allocate a new XF table when a new worksheet is created. When invoked, item 1302 allocates an array in memory which is of sufficient size to accommodate 61 XF table entries as well as 32 overflow table entries. Item 1304 then sets the variable IxfeFree equal to 61 and sets the variable IxfeMax equal to 93. Item 1306 sets all of the fEntry bits to false to indicate none of the allocated cells are yet in use. The routine then returns.

Figure 14:
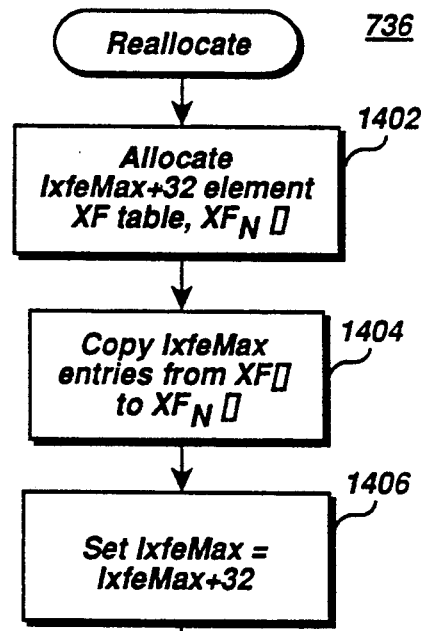
FIG. 14 is a flow diagram of the reallocate table routine invoked by the routine of FIG. 7.

Referring now to FIG. 14, the routine 736 is invoked by the IxfeFromXF(xf) routine to reallocate a table when the table must be expanded to accommodate new table entries, wherein, in the preferred practice of the present invention, the XF table may be expanded to accommodate a maximum of approximately 4,000 table entries. Preferably, the XF table is expanded in increments of 32 table positions at a time. When invoked, item 1402 allocates a new XF table which contains 32 more positions than the previous XF table. Item 1404 then copies the contents of the old XF table (XF) into the newly allocated XF table (XF$_N$). Next, item 1406 increments the variable IxfeMax by 32. Item 1408 then deallocates the original XF table. Item 1410 then resets the head of the table to point to the head of the new table in memory and the routine returns.

Figure 15:
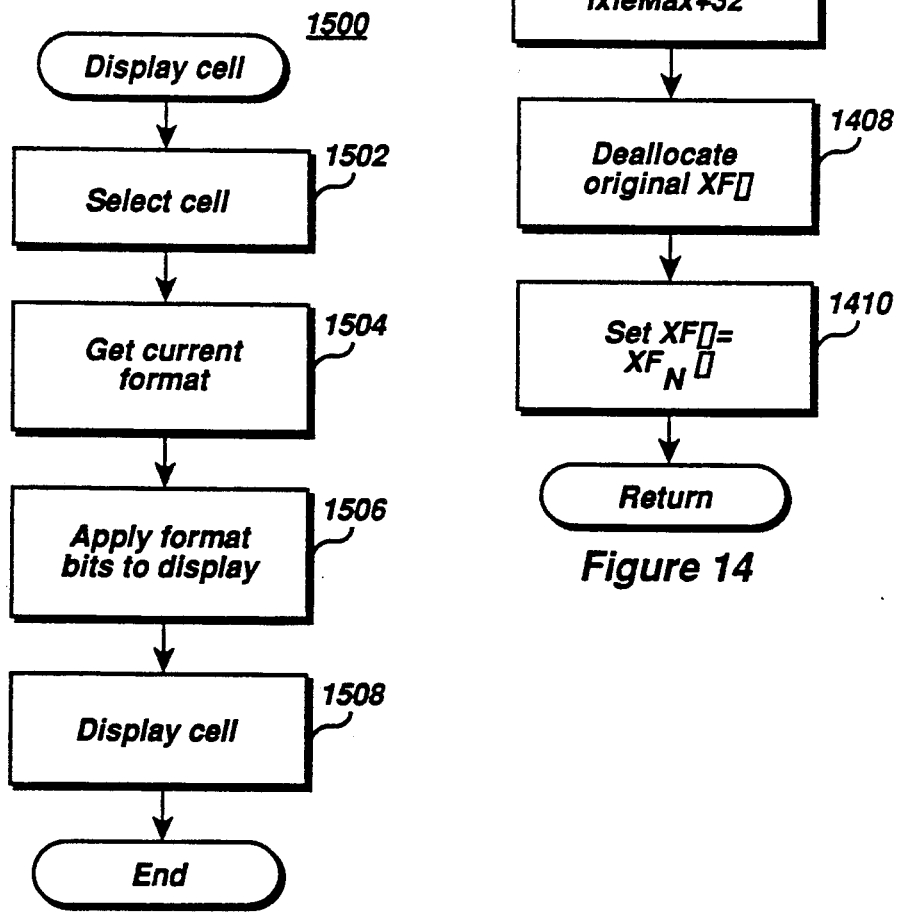
FIG. 15 is a flow diagram of the routine invoked to display cells.

Referring now to FIG. 15, the routine 1500 is invoked to display the cells of a worksheet. While the routine 1500 is discussed in terms of a single cell, those skilled in the art will appreciate that the routine 1500 may be invoked repetitively to display an entire worksheet. When invoked, item 1502 selects a cell of interest. Item 1504 then uses the index within the cell to read the cell format from the XF table. Item 1506 then applies the format bits to the cell and the cell is displayed by item 1508. The present invention optimizes the speed of this process invention since display format characteristics are determined by a simple table look-up mechanism.

Accordingly, an improved method and system for applying enhanced formatting information to the data in cells of a worksheet has been described. In accordance with the principles of the present invention, a wide variety of formatting information may be associated with a worksheet cell without significantly increasing the size and memory requirements of the worksheet. The principles of the present invention are also readily applicable to virtually any type of computer application, such as word processors, data bases, etc. Accordingly, other uses and modifications of the present invention will be apparent to persons of ordinary skill without departing from the spirit and scope of the present invention, and all of such uses and modifications are intended to fall within the scope of the appended claims.

We claim:

1. An improved method of formatting cells and characters in a spreadsheet, said method comprising the steps of:
    allocating a worksheet having a plurality of cells containing data elements, some of said cells being associated with other cells in accordance with a predefined mathematical relationship;
    allocating a table for storing format combinations which represent the appearance of said cells and said data elements within said cells;
    combining bits of cell formatting information to create a default format combination;
    generating an index to the default format combination using a predetermined hashing function;
    storing the default format combination in the table according to the index; and
    initializing each of said cells with the index to point to said default format combination.

2. The method of claim 1, wherein changing a cell format comprises the steps of:
    recalling the index for a cell of interest;
    recalling the format pointed to by said index;
    modifying relevant bits in said format combination in accordance with a desired format to generate a modified format combination;
    hashing said modified format combination to generate a modified index and installing said format combination in said table in accordance with the modified index; and
    returning said modified index pointer to said cell of interest.

3. The method of claim 2, further including the step of installing a format combination in an overflow table if a modified format combination hashes to an index already in use.

4. The method of claim 3, further including ordering the entries in said table so that the most frequently used format combinations appear before less frequently used format combinations in said table.

5. The method of claim 3, further including scanning said table for an existing format combination upon creation of a modified format combination and returning the index for the existing format combination to the cell of interest if a duplicate entry is found.

6. An improved data structure for use with an application program, comprising:
    a table for storing a plurality of format combinations;
    a character or group of characters which are displayed according to one of the format combinations, wherein said character or group of characters is associated with an invisible index which relates said character or group of characters to a format combination in said table;
    means for modifying the format combination associated with a character or group of characters; and
    means for installing said modified format combination in said table according to a predetermined hash function and means for updating the index of said characters or group of characters.

7. The improved data structure of claim 6, further including an overflow table for storing format combinations which hash to a value already used by an existing format combination.

8. The improved data structure of claim 6, further including means for detecting and eliminating duplicate entries in said table.

9. A method of formatting a spreadsheet having data displayed in a plurality of cells, comprising:
    allocating a table that stores format combinations;
    generating an index for each format combination using a predetermined hashing function;
    storing each format combination in the table according to the index generated for the format combination;
    associating one of the indices with each cell; and
    displaying each cell according to the format combination for the index associated with the cell.

10. The method of claim 9, further including ordering the format combinations in the table so that more frequently used format combinations appear before less frequently used format combinations.

11. The method of claim 9, further including installing a new format combination in an overflow table if the index generated for the new format combination is equal to the index for another format combination.

12. The method of claim 10, further including:
    combining bits of formatting information to create a modified format combination;
    generating a modified index for the modified format combination using the predetermined hashing function;
    replacing a previous index for a cell with the modified index; and
    displaying the cell according to the modified format combination for the modified index.

13. The method of claim 9, further including:
    combining bits of formatting information to create a modified format combination;
    scanning the table for an existing format combination identical to the modified format combination;
    replacing a previous index for a cell with the index for the existing identical format combination; and
    displaying the cell according to the existing identical format combination.

14. The method of claim 9, further including:
    saving the spreadsheet including each cell together with the index associated with the cell; and
    saving the table after removing currently unused format combinations.

15. An improved spreadsheet structure comprising:
    a plurality of data cells displayed according to one or more format combinations;

a table for storing the format combinations, each format combination being associated with an index; and means for associating one of the indices with each cell such that each cell is displayed according to the format combination associated with the index for the cell.

16. The improved spreadsheet structure of claim 15 wherein each index is a hashed pointer resulting from a predetermined hashing function.

17. The improved spreadsheet structure of claim 15, further including means for modifying the format combination associated with the index for a cell and means for updating the index to correspond to the modified format combination.

18. The improved spreadsheet structure of claim 15, further including means for ordering the format combinations in the table so that more frequently used format combinations appear before less frequently used format combinations.

19. The improved spreadsheet structure of claim 15, further including an overflow table that stores a new format combination if the index for the new format combination is equal to the index for a previous format combination.

20. The improved spreadsheet structure of claim 15, further including:

means for modifying a format combination;

means for scanning the table for an existing format combination identical to the modified format combination; and means for replacing a previous index for a cell with the index for the existing identical format combination.

* * * * *

UNITED STATES PATENT AND TRADEMARK OFFICE
CERTIFICATE OF CORRECTION

PATENT NO. : 5,231,577
DATED : July 27, 1993
INVENTOR(S) : Michael C. Koss

It is certified that error appears in the above-indentified patent and that said Letters Patent is hereby corrected as shown below:

In column 10, claim 12, line 42, please delete "10" and substitute therefor --9--.

Signed and Sealed this

Sixteenth Day of August, 1994

Attest:

BRUCE LEHMAN

Attesting Officer

Commissioner of Patents and Trademarks